United States Patent
Terakado et al.

(10) Patent No.: US 6,752,332 B1
(45) Date of Patent: Jun. 22, 2004

(54) ELECTRONIC FUEL INJECTION VALVE

(75) Inventors: Katsuyoshi Terakado, Urizura (JP); Arata Kagiyama, Naka (JP); Noboru Baba, Hitachiota (JP); Shizuka Yamaguchi, Hitachinaka (JP); Masahiro Souma, Hitachi (JP); Shuichi Shimizu, Ooarai (JP)

(73) Assignees: Hitachi, Ltd., Tokyo (JP); Hitachi Car Engineering Co., Ltd., Ibaraki (JP)

( * ) Notice: Subject to any disclaimer, the term of this patent is extended or adjusted under 35 U.S.C. 154(b) by 0 days.

(21) Appl. No.: 10/048,945

(22) PCT Filed: Aug. 4, 2000

(86) PCT No.: PCT/JP00/05253

§ 371 (c)(1),
(2), (4) Date: Feb. 6, 2002

(87) PCT Pub. No.: WO01/11225

PCT Pub. Date: Feb. 15, 2001

(30) Foreign Application Priority Data

Aug. 6, 1999 (JP) .......................................... 11-223420

(51) Int. Cl.⁷ ........................... F02M 51/00; B05B 1/00
(52) U.S. Cl. ................................ 239/585.1; 239/585.2; 239/585.3; 239/585.4; 239/585.5; 239/533.11; 239/591
(58) Field of Search ........................ 239/533.11, 585.1, 239/585.2, 585.3, 585.4, 585.5, 591

(56) References Cited

U.S. PATENT DOCUMENTS

| | | | | |
|---|---|---|---|---|
| 4,231,525 A | * | 11/1980 | Palma | ...................... 239/585.4 |
| 5,012,982 A | | 5/1991 | Souma et al. | |
| 5,595,612 A | | 1/1997 | Dingremont | |
| 5,732,888 A | * | 3/1998 | Maier et al. | ............. 239/585.1 |

FOREIGN PATENT DOCUMENTS

| | | |
|---|---|---|
| DE | 37 38 877 | 5/1988 |
| DE | 44 15 525 | 11/1995 |
| FR | 2606830 | 5/1988 |
| FR | 2705692 | 12/1994 |
| GB | 2198589 | 6/1988 |
| JP | 63-297870 | 12/1988 |
| JP | 01-129958 | 5/1989 |
| JP | 01-163462 | 6/1989 |
| JP | 01-310165 | 12/1989 |
| JP | 05-021162 | 3/1993 |
| JP | 07-063135 | 3/1995 |
| JP | 07-070735 | 3/1995 |
| JP | 07-208293 | 8/1995 |

* cited by examiner

Primary Examiner—Robin O. Evans
(74) Attorney, Agent, or Firm—Crowell & Moring LLP

(57) ABSTRACT

In an electronic fuel injector used in a combustion system using gas fuel, the present invention suppresses wearing of worn portions to make control of stable supply of gas fuel possible by forming a surface reforming layer (nitrided layer etc.) having wear resistance on a surface of a structural material of worn portions of the electronic fuel injector.

9 Claims, 3 Drawing Sheets

AMOUNT OF WEAR AFTER
OPERATION ENDURANCE TEST ( μm )

| No | CONVENTIONAL INJECTOR (FOR GASOLINE) | INJECTOR OF PRESENT INVENTION |
|---|---|---|
| 1 | 70 | 3 |
| 2 | 219 | 6 |
| 3 | 334 | 13 |
| 4 | 380 | 18 |

ELECTRONIC FUEL INJECTION VALVE

FIELD OF THE INVENTION

The present invention relates to an electronic fuel injector using gas fuel, and particularly to an electronic fuel injector which improves wearing resistance of the constituting members when it is used for a fuel supply system for a vehicle.

BACKGROUND OF THE INVENTION

Conventional electronic fuel injectors, in the cases of using gasoline fuel, can be roughly classified into two types, that is, a ball-type injector having a ball-shaped tip moving part as shown in Japanese Patent Application Laid-Open No.1-310165 and a pintle-type injector having a triangular tip moving part, but the injectors of the both types are nearly the same in the structures and the functions. That is, the electronic fuel injector comprises a stator core; a magnet coil concentric with the stator core; a casing formed of a magnetic material, the casing containing the stator core and the magnet coil inside; a moving part having a valve body in the tip of the moving part; a stopper for the moving part; a valve seat opposite to the stopper, the moving part being interposed between them; and a spring for pushing the moving part against the valve seat by engaging with one end of the moving part. Therein, when current is conducted to the magnet coil to form a magnetic circuit and the produced magnetic force overcomes a spring force pushing the moving part, the tip of the valve body is detached from the valve seat to open the electronic fuel injector. When the current is cut off, the valve body is moved toward the valve seat to close the electronic fuel injector.

In the fuel injector described above, the valve body in the tip of the moving part and the valve seat need to be wearing-resistant because they collide with each other. Therefore, a material of high carbon (C) and high chromium (Cr) martensitic stainless steel such as JIS-SUS440C or JIS-SUS420J2 shown in the above published reference hardened by quenching and tempering to be used for the valve body and the valve seat.

As for the conventional electronic fuel injector using gasoline fuel, in the electronic fuel injector for a vehicle, the martensitic stainless steel described above can cope with the wearing resistance of the construction material for guaranteeing performance of the electronic fuel injector, which maintains the lifetime of the vehicle, due to lubricating and cooling power of gasoline fuel. However, in recent years, as attention is focused on the global environmental issue, various kinds of exhaust controls are imposed on the motor vehicle industry. As the countermeasures for the exhaust controls, electric vehicles of zero-emission are already in the market. On the other hand, a fuel system substantially cleaning exhaust gas by using gas such as natural gas and performing precise fuel supply control using an electronic fuel injector, which is different from the conventional control of propane gas, is being developed.

However, because such gas fuel, particularly, gas is very poor in lubricity compared to gasoline, in the conventional electronic fuel injector for gasoline fuel there occurs a problem that worn portions such as the valve body and the valve seat in the components are worn. When wearing occurs, for example, in one of or both of the valve body and the valve seat, not only the injection characteristic of gas fuel is changed, but also the seating performance is deteriorated particularly when wearing occurs in the seat portion. The deterioration of seating performance makes an engine difficult to start when the engine is restarted because of fuel leakage after stopping of the engine, or causes a problem of an explosion or a fire.

SUMMARY OF THE INVENTION

An object of the present invention is to provide an electronic fuel injector which can perform stable control of gas fuel supply without wearing in the worn portions by solving the problem in the conventional technology described above.

In order to attain the above object, the present invention improves wear resistance by forming a surface reforming layer having wear resistance on a surface of a structural material of worn portions of the electronic fuel injector.

It is preferable that the surface reforming layer having wear resistance is a nitrided layer, and it is particularly preferable that a hard film made of CrN, TiN, or a nitride or a carbide of a transition metal such as BN, WC/C, or DLC (diamond-like carbon) or diamond is formed on the nitrided layer to form a composite layer. Further, the surface reforming layer having wear resistance is an Ni—P plated layer hardened by age-hardening, or the wear resistance durability can be further obtained by forming an Ni—P plated layer on the nitrided layer described above to make a composite layer.

In order to improve the wear resistance of the constituting members of the fuel injector for gas fuel subjected to a large impact force as described above, the surface reforming of the worn members is necessary, but the surface reforming is not limited to the nitrided layer or the composite layer using the hard film together described above. Instead of the nitrided layer, a carburized layer, a carbnitrided layer or a soft-notrided layer may be used. Further, it is clear that a composite layer of the above layer and the hard film or the Ni—P plating described above has the effect to improve the wear resistance.

Operation of the present invention will be described below. In the electronic fuel injector using gas for fuel, considered causes of occurring wear in the constituting members are as follows.

That is, for example, because the fuel is in a non-lubricant gas phase, different from gasoline, in the valve body of the moving part and the valve seat and in the stopper and the worm portion of the moving part in the other side of the wear, the impact load becomes approximately 25 kgf and the impact surface pressure becomes around 90 kgf/mm$^2$ in the initial stage of wearing due to a small contact surface. Therefore, mainly, impact wearing strongly acts on the structural material of the conventional fuel injector for gasoline fuel. This means that the problem of securing of wear resistance can not be solved by using only the conventional structural material of the martensitic stainless steel.

Further, in regard to the sliding portions between the valve body of the moving part and the guide ring of the other side of the wear, and between the moving part and the bore portion of the stator core, it is found from a duration test that an amount of wear become considerably large because of the non-lubricant gas atmosphere though the wearing load is small.

The present invention can provide an electronic fuel injector which can suppress occurrence of the above-described wear and does not cause wear in the each of the worn portions even used under a gas fuel atmosphere by forming a surface reforming layer having good wear resistance at least on one side. Preferably, on both sides of these worn portions as the wear countermeasures of the friction wear members described above.

DESCRIPTION OF THE PREFERRED EMBODIMENTS

Figure 1:
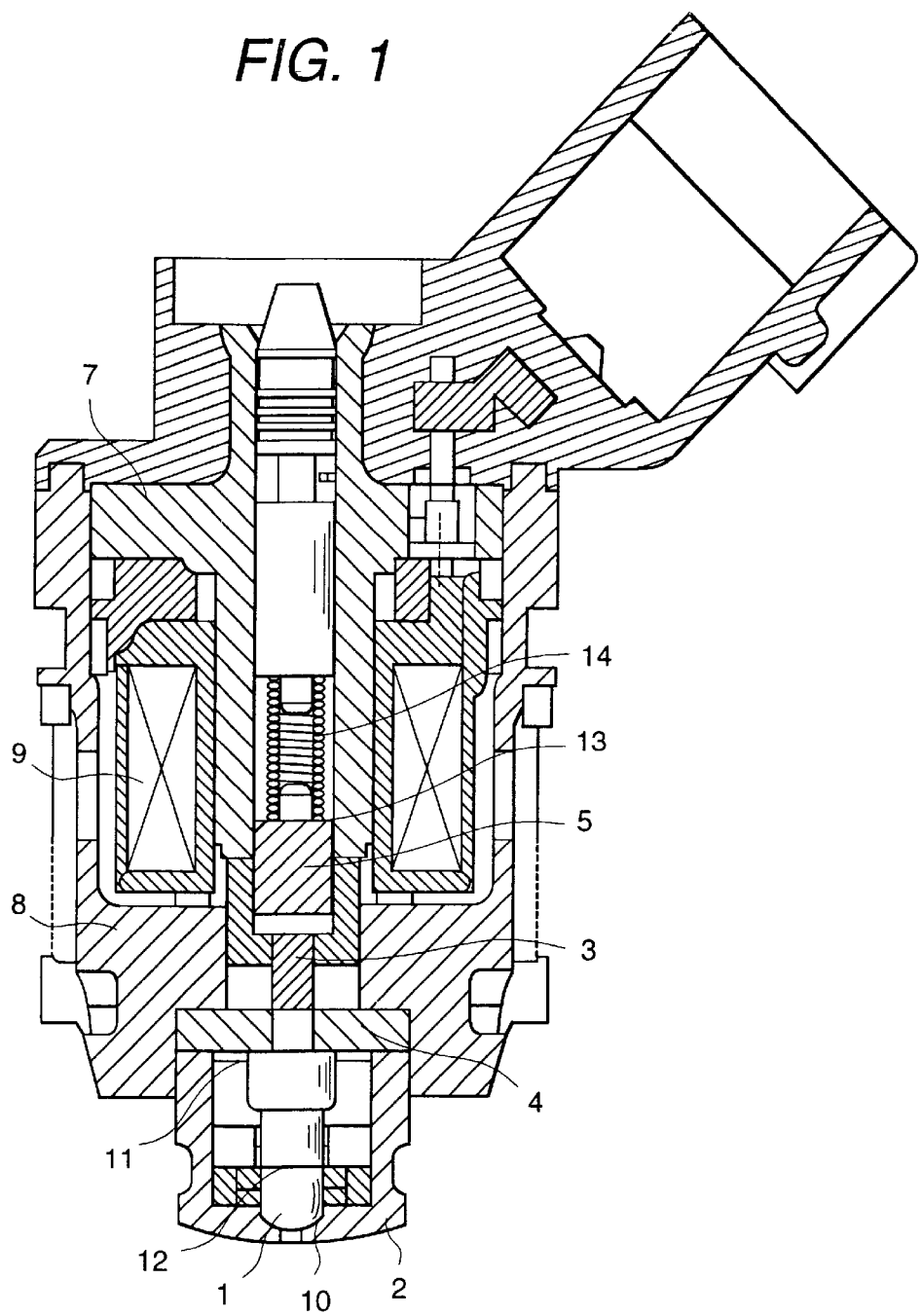
FIG. 1 is a cross-sectional view showing an embodiment of an electronic fuel injector in accordance with the present invention.

An embodiment of the present invention will be described below, referring to the accompanied drawings. Referring to FIG. 1, the present embodiment of the electronic fuel injector comprises a stator core 7; an magnet coil 9 concentric with the stator core 7; a casing 8 formed of a magnetic material, the casing 8 containing the stator core 7 and the magnet coil 9 inside; a moving part 3 having a spherical valve body 1 in the tip of the moving part 3 and a lower end moving part guide 5 fixed to a bore portion of an armature in the upper end; a stopper 4 for the moving part 3; a valve seat 2 opposite to the stopper 3, the moving part 3 being interposed between them; and a spring 14 for pushing the moving part against the valve seat 2 by engaging with one end of the moving part 3. Therein, when current is conducted to the magnet coil 9 to form a magnetic circuit and the produced magnetic force overcomes a force of the spring 14 pushing the moving part 3, the valve body 1 in the tip of the moving part is moved upward to open the electronic fuel injector. When the current is cut off, the valve body is moved downward to close the electronic fuel injector.

Figure 2:
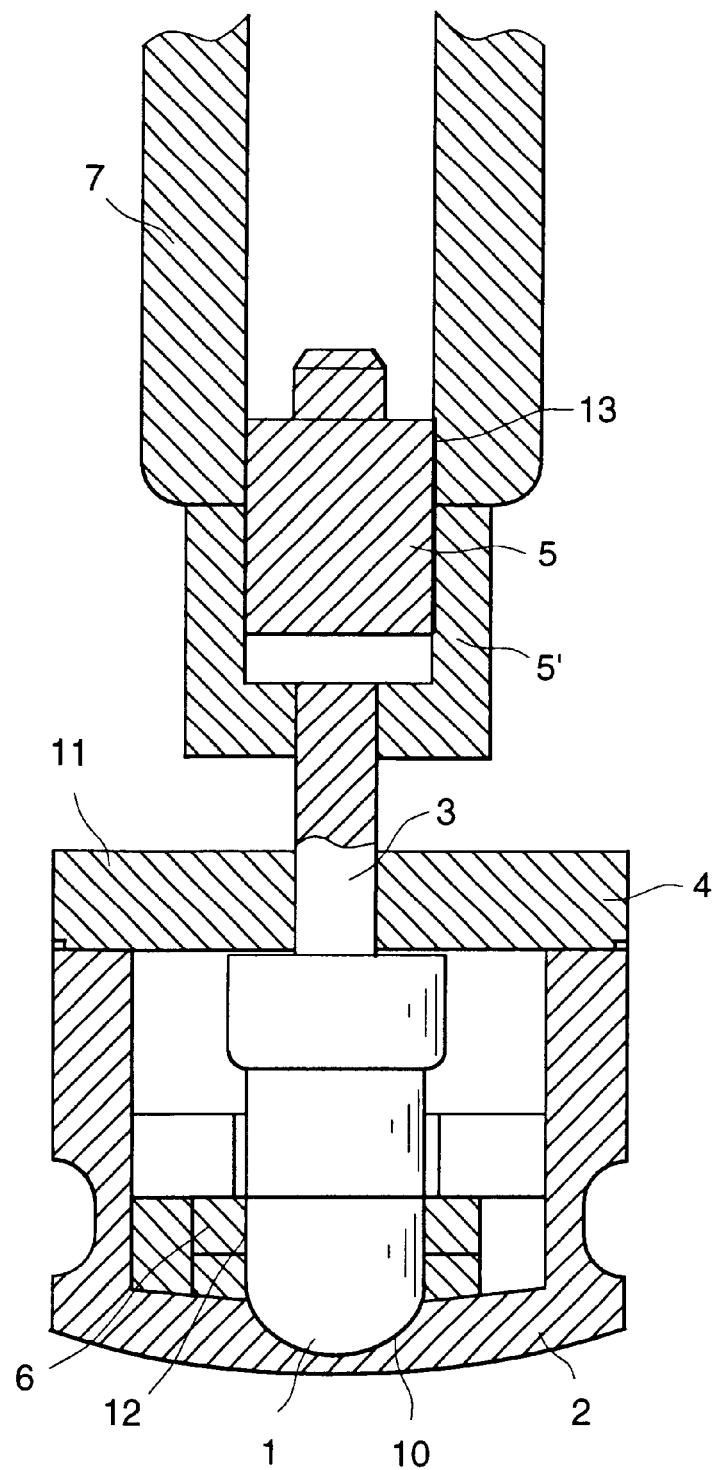
FIG. 2 is an enlarged view showing the main portion of the electronic fuel injector shown in FIG. 1.
Figures 3, 4:
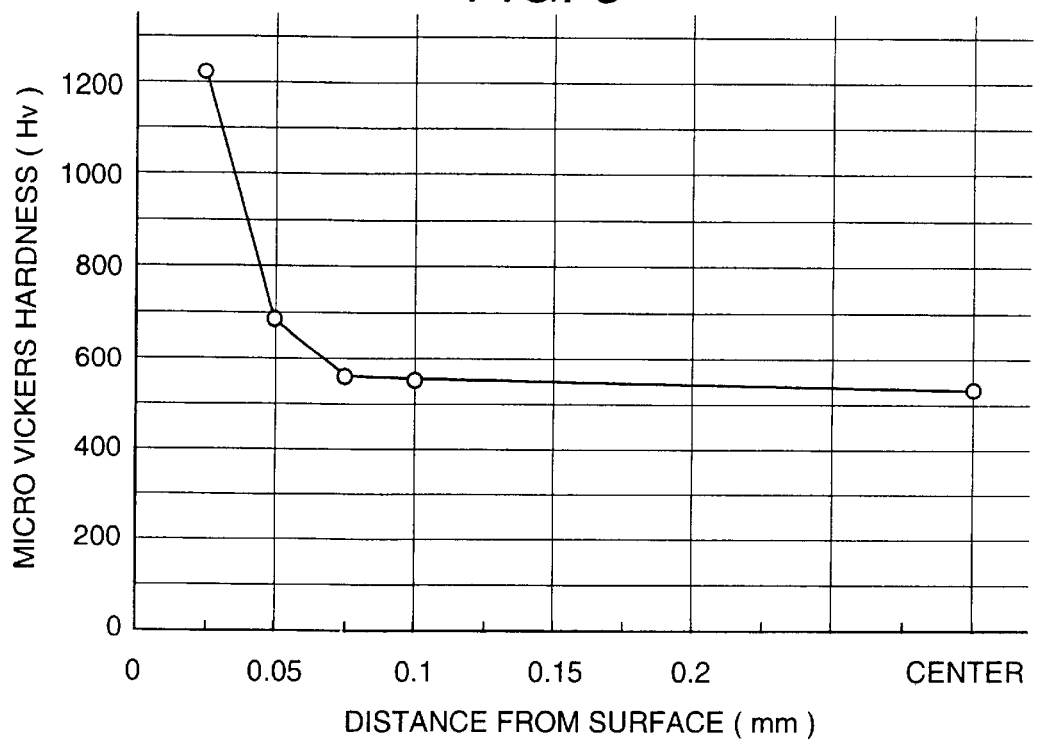
FIG. 3 is a graph showing the distribution of hardness along the distance from a surface of a valve body after performing nitriding treatment as surface reforming.
FIG. 4 is a table showing wear amounts before and after an operating duration test by natural gas using the electronic fuel injector shown in FIG. 1.

FIG. 2 is an enlarged view showing a portion of the valve body 1 and the valve seat 2 and the moving part 3. The worn portions targeted by the present application are the valve body 1 and the seat portion 10 of the valve seat 2; the stopper 4 and the collision portion 11 with the moving part 3; the valve body 1 and the worn portion 12 with the lower end moving part guide 6; and the upper end moving part guide 5 fixed to the armature bore portion of the moving part 3 and the worn portion 13 of the stator core 7. The feature of the present invention is that the surface of the structural material of each of the worn portions is treated with surface reforming as the wear countermeasures. FIG. 3 shows the distribution of hardness along the distance from a surface of the moving part valve body 1 after performing plasma nitriding treatment of 530° C., 3 h using DC glow discharge. The material for the moving part valve body 1 is JIS SUS440C. It can be understood from the result that the hardness at the topmost surface is 1050 Hv and the total depth of the hardened layer is about 60 μm. The material for the valve seat 2, the moving part 3 and the stopper 4 is JIS SUS420J2, the material for the upper moving part guide 5 is JIS SUS304, and the material for the stator core 7 is a 13Cr group magnetic stainless steel. However, the hardness distributions for these materials are almost similar to that for SUS 440C shown in FIG. 3.

A 500-million-cycle operating duration test of an electronic fuel injector for gas fuel having the wear-resistant treated worn portions and a conventional injector for gasoline using natural gas (85% butane-15% methane) as the gas was conducted. FIG. 4 shows the comparatively measured results of the wear amounts of the valve bodies 1 before and after the operating duration test. According to the results, the wear amount of the conventional fuel injector was 70~380 μm. On the other hand, the wear amount of the electronic fuel injector for gas fuel having the wear-resistant treated worn portions was 3~18 μm, and the flow rate change of natural gas was also within a target specification of ±5%. As the result, it is clarified that the surface reformation is very effective for the electronic fuel injector for gas fuel.

In addition to the above, a surface reforming method to further increase the electronic fuel injector for gas fuel is that a ceramic film made of a transition metal carbide or nitride having a thickness of several μm is further formed on the topmost surface of the plasma nitriding treated material described above. There, after plasma nitriding treatment, the plasma nitriding treated material was coated with CrN through an activated reaction evaporation method (ARE) of the physical vapor deposition method (P.V.D) by which good adherence with the base material could be obtained. A film having a thickness of approximately 2 μm was obtained under film forming conditions of reaction gas: $N_2$, evaporation substance: Cr, gas pressure: ~0.13 Pa, electron beam power: 5 kW, 140 mA, substrate applied voltage: DC −400 V, substrate temperature: ~400° C., and coating time: 1 hour. Using an electronic fuel injector having a composite surface reformed layer composed of a nitrided layer under the surface of the material described above and a hard CrN film having a hardness of approximately 2000 Hv on the topmost surface, a 500-million-cycle operating duration test by natural gas similar to the above-mentioned test was conducted. The test result showed little wear.

On the other hand, there is a traditional method of improving the wear resistance, that is, Ni—P plating. In this case, precipitation age-hardening treatment was performed at 350° C. after plating in order to increase hardness of the plating layer, and hardness of 800 Hv was obtained. By this surface reforming treatment, wear in the sliding worm portions 12 and 13 was small, but the wear amount before and after the above-mentioned duration test in the collision worn portion 10 and 11 became 50~85 μm. This method was inferior to the wear resistance of the nitrided layer or the CrN layer, but had an effect as wear resistant countermeasures.

In an electronic fuel injector using gas phase fuel such as natural gas, it is possible to provide the structure which can give a stable and reliable injection characteristic by reducing wear in each of the worn portions, particularly, in the collision portions as small as possible, and is good in starting performance and safe by eliminate fuel leakage during stopping operation of the engine.

What is claimed is:

1. An electronic fuel injector comprised of a stator core; a magnet coil concentric with said stator core; a casing formed of a magnetic material, said casing containing said stator core and said magnet coil inside; a moving part having a valve body in a tip of the moving part; a stopper for said moving part; a valve seat opposite to said stopper, said moving part being interposed between said valve seat and said stopper; and a spring for pushing said moving part against said valve seat by engaging with one end of said moving part, said moving part being reciprocally moved between said valve seat and said stator core by a magnetic force produced by said magnet coil and a force of said spring, wherein a surface reforming layer having wear resistance is formed on surfaces of sliding portions of said valve body in the tip of said moving part and of said valve seat; surfaces of said valve body and a guide ring of said valve body; of colliding surfaces of said stopper and said moving part; and of sliding surfaces between said moving part and said stator core.

2. An electronic fuel injector according to claim 1, wherein said surface reforming layer having wear resistance is a nitrided layer.

3. An electronic fuel injector according to claim 1, wherein said surface reforming layer having wear resistance is a composite layer of a nitrided layer and a hard film.

4. An electronic fuel injector according to claim 1, wherein said surface reforming layer having wear resistance is an Ni—P plated layer.

5. An electronic fuel injector according to claim 1, wherein said surface reforming layer having wear resistance is a composite layer of a nitrided layer and an Ni—P plated layer.

6. An electronic fuel injector according to claim 1, wherein said surface reforming layer is a plated layer.

7. An electronic fuel injector comprised of a stator core; a magnet coil concentric with said stator core; a casing formed of a magnetic material, said casing containing said stator core and said magnet coil inside; a moving part having a valve body in a tip of the moving part; a stopper for said moving part; a valve seat opposite to said stopper, said moving part being interposed between said valve seat and said stopper; and a spring for pushing said moving part against said valve seat by engaging with one end of said moving part, said moving part being reciprocally moved between said valve seat and said stator core by a magnetic force produced by said magnet coil and a force of said spring, wherein a surface reforming layer having wear resistance is formed on at least one side of surface portions of sliding surfaces of said valve body in the tip of said moving part and said valve seat of worn portions; of said valve body and a guide ring of said valve body; of colliding surfaces of said stopper and said moving part; and a of sliding portion surfaces between said moving part and said stator core, wherein said surface reforming layer is selected from the group consisting of at least one of a nitride layer, a composite layer of a nitride layer and a hard film, an Ni—P plated layer and a composite layer of a nitride layer and an Ni—P plated layer.

8. A method of using an electronic fuel injector comprised of a stator core; a magnet coil concentric with said stator core; a casing formed of a magnetic material, said casing containing said stator core and said magnet coil inside; a moving part having a valve body in a tip of the moving part; a stopper for said moving part; a valve seat opposite to said stopper, said moving part being interposed between said valve seat and said stopper; and a spring for pushing said moving part against said valve seat by engaging with one end of said moving part, said moving part being reciprocally moved between said valve seat and said stator core by a magnetic force produced by said magnet coil and a force of said spring, comprising forming a surface reforming layer having wear resistance on at least one side of surface portions of said valve body in the tip of said moving part and said valve seat of worn portions; of said valve body and a guide ring of said valve body; of colliding portions of said stopper and said moving part; and of sliding surfaces between said moving part and said stator core, and using the electronic fuel injector in a gas fuel supply environment.

9. A method according to claim 8, further comprising selecting said surface reforming layer from the group consisting of at least one of a nitride layer, a composite layer of a nitride layer and a hard film, an Ni—P plated layer and a composite layer of a nitride layer and an Ni—P plated layer.

* * * * *